United States Patent [19]

DeRosa et al.

[11] 4,083,048
[45] Apr. 4, 1978

[54] TIME ALIGNMENT ERROR SENSOR SYSTEM FOR RANGE TRACKING

[75] Inventors: Robert J. DeRosa, Sudbury; Robert T. Campbell, Acton, both of Mass.

[73] Assignee: The United States of America as represented by the Secretary of the Army, Washington, D.C.

[21] Appl. No.: 752,505

[22] Filed: Dec. 20, 1976

[51] Int. Cl.² ............................................. G01S 9/14
[52] U.S. Cl. .................................................. 343/7.3
[58] Field of Search ........................................ 343/7.3

[56] References Cited
U.S. PATENT DOCUMENTS

| | | | |
|---|---|---|---|
| 2,776,426 | 1/1957 | Altman | 343/7.3 X |
| 3,141,163 | 7/1964 | Parode et al. | 343/7.3 |

Primary Examiner—T.H. Tubbesing
Attorney, Agent, or Firm—Nathan Edelberg; Robert P. Gibson; Freddie M. Bush

[57] ABSTRACT

In the error sensor system for range tracking, incoming radio frequency pulses are coupled into two gates, an RF gate and an early-late gate. The signals are then processed and summed in quadrature to provide measurement of time alignment error between the RF pulses and a time reference for range tracking. Quadrature summing of the signals allows the time alignment error to be encoded as a phase angle which allows error decoding between the incoming radar frequency and the range tracker gating period, the alignment error being resolved by phase detecting the amplitude limited signal output.

2 Claims, 4 Drawing Figures

TIME ALIGNMENT ERROR SENSOR SYSTEM FOR RANGE TRACKING

DEDICATORY CLAUSE

The invention described herein was made in the course of or under a contract or subcontract thereunder with the Government and may be manufactured, used and licensed by or for the Government for governmental purposes without the payment to us of any royalties thereon.

BACKGROUND OF THE INVENTION

In conventional systems automatic gain control and precise open loop gain tracking over a wide dynamic range is required for measuring time alignment error of the input signal. FIG. 1 discloses a typical conventional or prior art system for range tracking. RF (radio frequency) pulses are coupled into respective gates 10 and 20. The outputs from the respective gates are coupled through narrow band filters 12 and 22 respectively and into amplifiers 14 and 24 respectively. The output signals from the amplifiers are coupled into a phase detector 30 which provides an output signal indicative of the polarity of the error. The output voltage from amplifier 14 is further coupled through an AGC (automatic gain control) unit and fed back to both amplifiers 14 and 24 to provide gain control; while the output of amplifier 24 is coupled to provide the time alignment error signal output in conjunction with the polarity output of phase detector 30. The gain tracking between the two channels is required since the error is derived from an amplitude measurement. AGC is necessary to normalize the output error as a function of signal levels. Specifically, the absolute magnitude of the error signal from amplifier 24 varies both as a function of the time alignment error and as a function of the magnitude of the input signal. In order to make the error measurement meaningful, the fluctuation of the error signal as a function of input levels must be removed. The AGC accomplishes this normalization such that the output signal from amplifier 24 varies only as a function of the time alignment error.

RF pulses are fed into the two gates, gate 10 being a normal radio frequency gate, gate 20 being a split gate or early-late gate. The RF pulse gated through gate 10 is coupled through a narrow band filter to provide coherent integration of the RF pulses. The resulting output of the narrow band filter is a continuous wave signal coupled through amplifier 14. The RF pulse gated through split gate 20 results in a bipolar type output pulse whose crossover is lined up with the center of the normal gate pulse of gate 10. Thus the split gate provides a 180° phase shift to the latter half of each gated signal. Therefore the RF output of the split gate which occurs during the first half of the split gate pulse is in phase with the RF input to gate 10, while the RF output occurring during the second half of the split gate pulse is 180° out of phase with the RF input to gate 10. The magnitude of the central line of the frequency spectrum at the output of the split gate is a function of the time alignment error between the RF pulse and the split gate pulse. The phase of the signal with respect to the voltage output of filter 12 indicates the sense of the alignment error. The central-line of the frequency spectrum is extracted by the narrow band filter.

SUMMARY OF THE INVENTION

Time alignment error between incoming radio frequency signal pulses and the gating period in which the pulses are received allows simplified range tracking of targets. The incoming pulses are coupled into both an RF gate and an early-late gate, filtered, and summed in quadrature. Any time alignment error is thereby encoded as a phase angle. The signals are then amplitude limited, reducing amplitude effects on the phase detector output signal, providing an output signal indicative of time alignment error for indicating and correcting for target range.

DESCRIPTION OF THE PREFERRED EMBODIMENT

Figure 1:
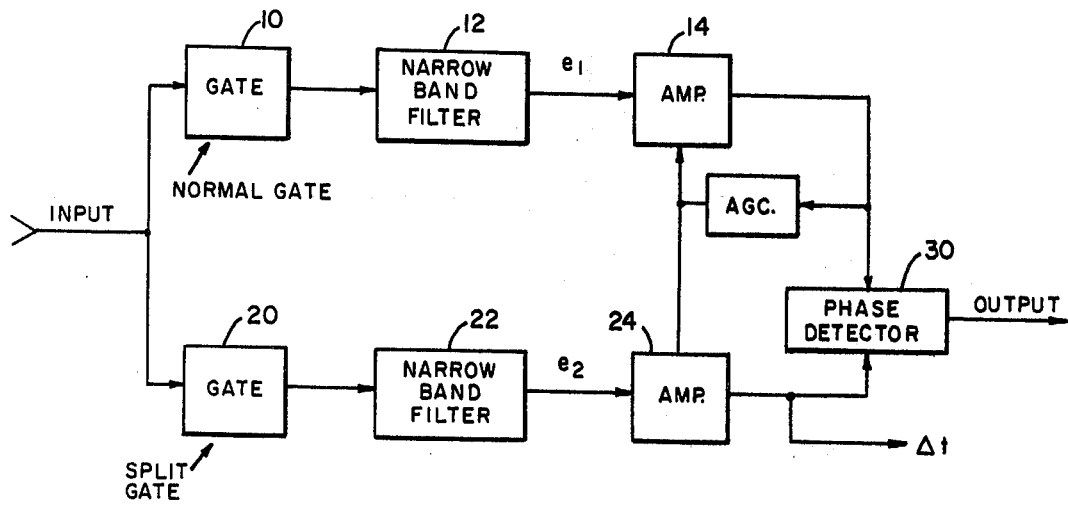
FIG. 1 is a block diagram of a conventional or prior art system for providing range error.
Figure 2:
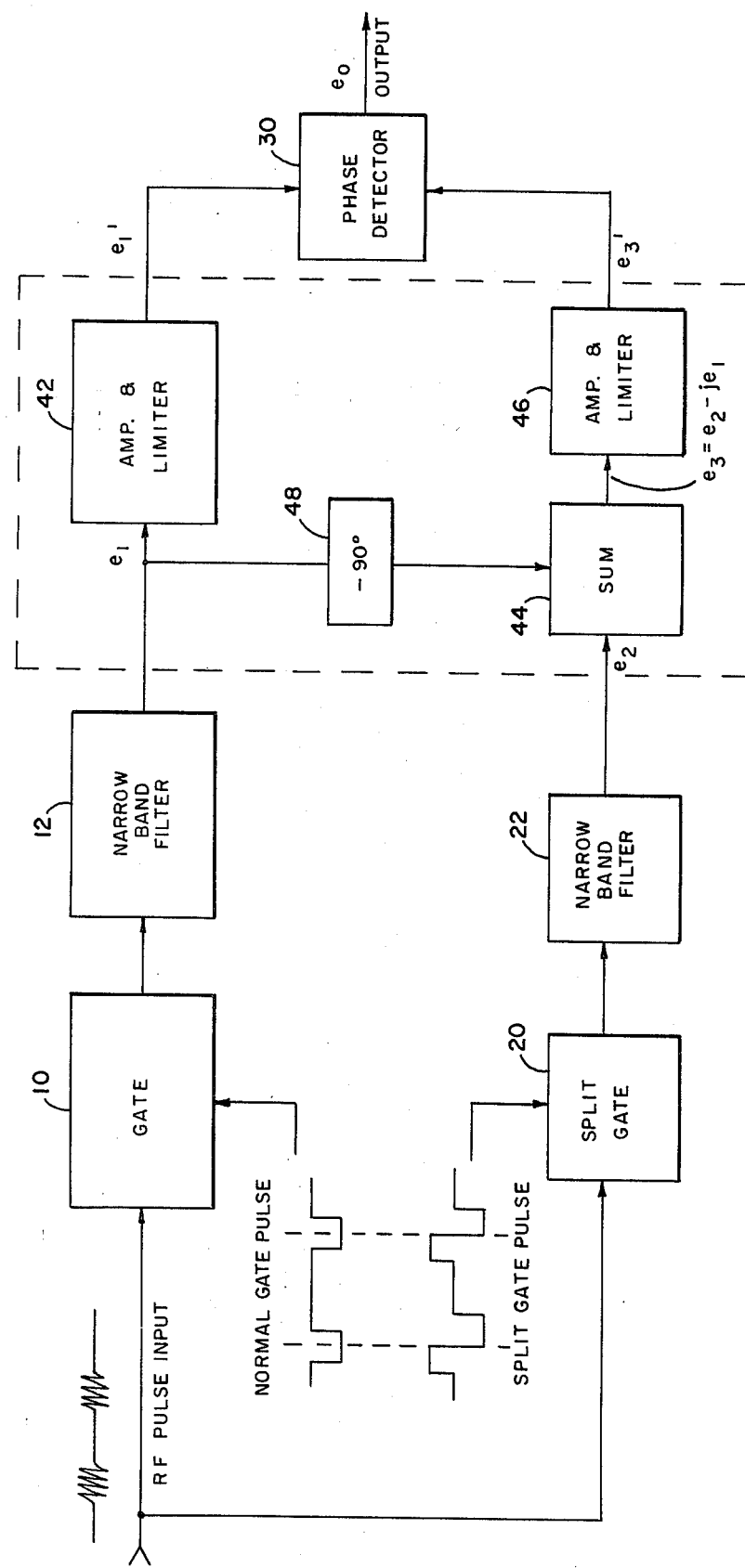
FIG. 2 is a block diagram of a preferred embodiment of the error sensor system for providing radar range tracking.

Referring now to the drawings wherein like numbers represent like parts, FIG. 1 discloses the conventional system drawing wherein input pulses of RF energy are coupled into two channels through parallel RF gates and a split gate. Operation of this prior art system has been disclosed in the Background of the Invention as a typical prior art device. FIG. 2 discloses a preferred embodiment of the invention wherein the input radio frequency pulse is coupled through RF gate 10 and narrow band filter 12 to an amplifier and limiter circuit 42, the output of amplifier-limiter circuit 42 being coupled as an input to phase detector 30. Similarly, the RF pulse input is coupled in a second channel through split gate or early-late gate 20 and narrow band filter 22 into a summing network 44. The output of summing circuit 44 is coupled as an input to an amplifier and limiter circuit 46, with the output of amplifier and limiter circuit 46 being coupled as an input to phase detector 30. The output of narrow band filter 12 is further coupled through a 90° phase shifter 48 as an input to summing circuit 44 for quadrature summing with the output of filter 22.

Signal processing through the system of FIG. 2 is conventional up to where the signal outputs of filters 12 and 22 are processed. In the conventional processing RF pulses are coupled into gates 10 and 20, with the RF pulse gated through the normal gate 10 being coupled through a narrow band filter to provide coherent integration of the RF pulses. The resulting output of narrow band filter 12 is a continuous wave signal defined as $e_1$. The RF pulse is also gated through the split-gate 20 by an early-late pulse gate whose crossover is lined up with the center of the normal gate pulse controlling gate 10. The split gate provides a 180° phase shift to the latter half of the gated signal. Thus, the RF output of the split-gate occurring during the first half of the split-gate pulse is in phase with the RF input; and the RF output occurring during the second half of the split-gate pulse is 180° out of phase with the RF input to gate 10. The magnitude of the central line of the frequency spectrum at the output of the split-gate is a function of the time alignment error between the RF pulse and the split-gate pulse. The phase of the signal with respect to $e_1$ indicates the sense of the alignment error. The central line of the spectrum is extracted by narrow band filter 22 whose output is $e_2$. A conventional time measuring system would normally measure the vector amplitude of this signal $e_2$. However, by summing the quadrature $e_1$ signal with the split-gate or early-late gate error signal $e_2$ to produce the composite signal $e_3 = e_2 - je_1$, the time alignment error is encoded as a phase angle which allows simple error decoding. The alignment error is resolved by phase detecting the amplitude limited $e_1$ signal ($e_1'$) with the amplitude limited $e_3$ signal ($e_3'$). The amplifier and limiter outputs 42 and 46 are adjusted so that the signal amplitude is at maximum amplitude and constant so that the only change coupled to phase detector 30 is the phase change associated with $e_3$.

The use of quadrature summing provides normalization of the error signal by converting the error from an amplitude quantity to a phase angle. Once a phase error has been formed the signals are amplitude limited to reduce dynamic range requirements and stringent gain tracking requirements are eliminated. Thus the system provides phase tracking of a target over a narrow band width.

Figure 3:
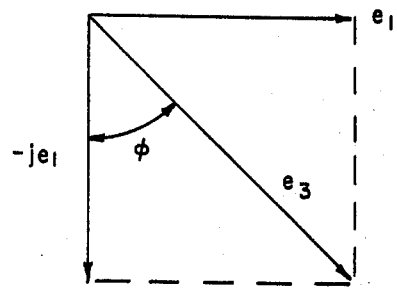
FIG. 3 is a vector diagram of signals passing through the error sensor system of FIG. 2.

FIG. 3 discloses the vector relationship of the signals affecting the output signal. The DC output of the phase detector ($e_0$) is proportional to the angle $\phi$, such that:

$$e_0 = K_1 \phi$$

$$\phi = \tan^{-1}(e_2'/e_1')$$

where:
$$e_1 = K_2$$

$$e_2 = K_2(\Delta t)$$

$\Delta t$ = time alignment error $K_1, K_2$ = constants therefore:

$$e_0 = K_1 \tan^{-1}(K_2/e_1)(\Delta t)$$

From the equation for $e_0$ it can be seen that the output ($e_0$) is zero for $\Delta t = 0$ (perfect alignment) and can be positive or negative depending on the sign of $\Delta t$. As the range from the system tracker to the target varies the positive or negative sign (polarity) of $\Delta t$ indicates that degree of range error to either side of the target, allowing the range gate to be increased or decreased accordingly to maintain track of the target.

Figure 4:
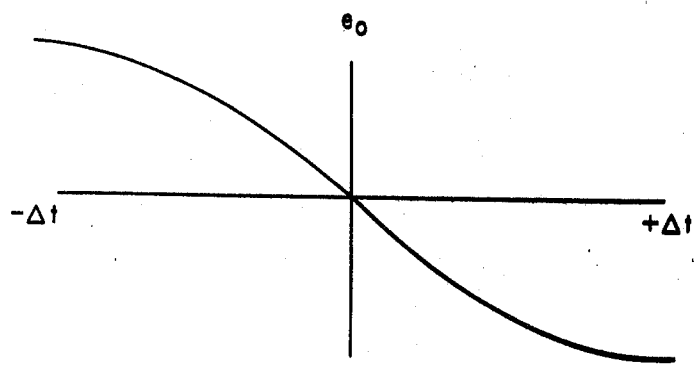
FIG. 4 is the phase detector output of a typical phase detector.

As shown in FIG. 4, the phase detector output signal $e_0$ increases in magnitude and polarity as the phase angle moves away from 0. Since the limiter circuit amplitude limits the signals to reduce the dynamic range, the error signal is provided substantially by the phase angle signal.

Although a particular embodiment and form of this invention has been illustrated, it is apparent that various modifications and embodiments of the invention may be made by those skilled in the art without departing from the scope and spirit of the foregoing disclosure. Accordingly the scope of the invention should be limited only by the claims appended hereto.

We claim:

1. An error sensor system for range tracking comprising: first and second narrow band filters each having an input and an output; first and second radio frequency gating circuits having inputs disposed to receive a common input signal and having respective outputs coupled to respective inputs of said filters; phase detection means having first and second inputs and an output; first and second amplifier-limiter circuits having respective inputs coupled to receive respective outputs of said first and second filters, and having respective outputs coupled to said first and second inputs of said phase detector means, said phase detector means output being disposed for providing an output voltage signal; a summing circuit having first and second inputs and an output, said first input being coupled to the output of said second filter, the output being coupled to the input of said second limiter-amplifier circuit; and a phase shifter coupled between the output of said first filter and the second input of said summing circuit for providing a phase-shifted signal input thereto.

2. An error sensor system for range tracking as set forth in claim 1 wherein said phase shifter is a 90° phase shifter for allowing quadrature summing in said summing circuit; said second gate is an early-late gate disposed for operation simultaneously with said first gate for providing bi-polar operation symmetrically within the operating time frame of said first gate.

* * * * *